E. N. McKIMM & J. R. GEARHART.

Feather-Renovators.

No. 134,914.  Patented Jan. 14, 1873.

Witnesses:  Inventor:
Edgar N. McKimm
John R. Gearhart
PER
Attorneys.

UNITED STATES PATENT OFFICE.

EDGAR N. McKIMM AND JOHN R. GEARHART, OF LATHROP, MISSOURI.

IMPROVEMENT IN FEATHER-RENOVATORS.

Specification forming part of Letters Patent No. 134,914, dated January 14, 1873.

*To all whom it may concern:*

Be it known that we, EDGAR N. McKIMM and JOHN R. GEARHART, of Lathrop, in the county of Clinton and State of Missouri, have invented a Feather-Renovator, of which the following is a specification:

The invention consists in providing the stirrers of a feather-renovator with loops at one end and a hinged concave clamp at the other, as hereinafter fully described.

We will now describe a renovator which we preferably use, and to which our invention is applied.

Figure 1:
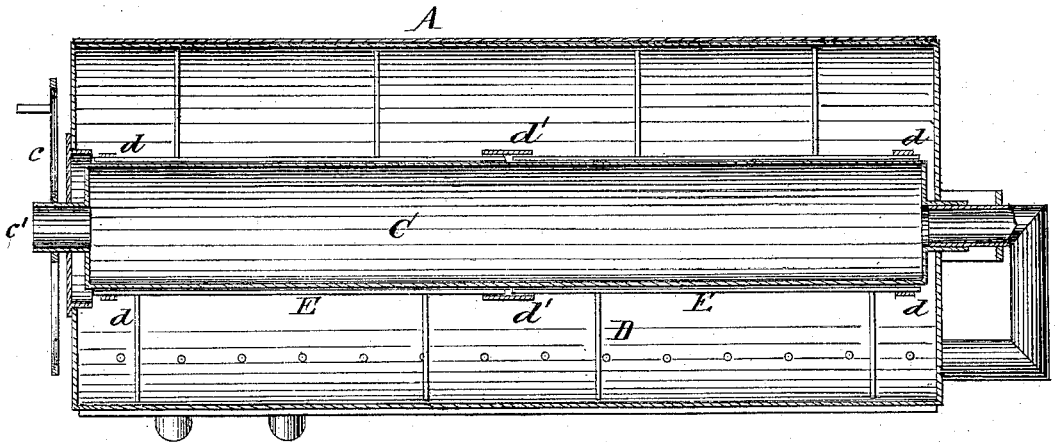
Figure 2:
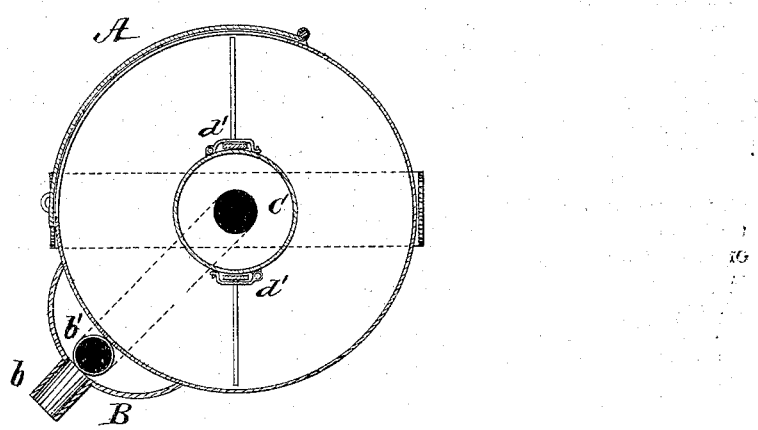

Figure 1 is a longitudinal sectional elevation, and Fig. 2 is a transverse section.

A in the drawing represents a stationary cylinder, preferably made of wood, although it may be made of any suitable material not having a tendency to corrode. B is an outside heating-chamber, arranged fixedly on and near the bottom of cylinder, and having one or more pipes, $b$, that connect with a heating apparatus. It also has a pipe, $b$, passing therethrough, and, by perforations, adapted to throw jets of steam upon the feathers which are on the bottom of cylinder. C is a hollow rotary heating-drum, journaled in center of cylinder, and rotated by a wheel, $c$, driven by any suitable power. It is connected by pipe $c'$ with the pipe $b'$ that comes from a steam-generator. Upon the surface of the drum C are arranged stirrers, D, which rotate and keep the feathers in constant motion. $d\,d$ are loops at each end of drum, in which are placed the ends of two stirrers, E, while the other ends are fastened by a hinged concave clamp, $d'$.

Having thus described our invention, what we claim as new, and desire to secure by Letters Patent, is—

The stirrers of a feather-renovator, combined with loops $d$ at one end, and hinged concave clamp $d'$ at the other, as and for the purpose described.

To the above specification of our invention we have signed our hands this 21st day of October, A. D. 1872.

EDGAR N. McKIMM.
JOHN R. GEARHART.

Witnesses:
I. L. KRYDER,
CHARLES H. GEARHART.